United States Patent [19]

Rzonca et al.

[11] Patent Number: 5,991,814
[45] Date of Patent: Nov. 23, 1999

[54] METHOD AND APPARATUS FOR CONTROLLING COMMAND LINE TRANSFER TO A NETWORK ELEMENT

[75] Inventors: Richard R. Rzonca, Raleigh; Ting-Wei Shieh, Chapel Hill, both of N.C.

[73] Assignee: Alcatel, Paris, France

[21] Appl. No.: 08/891,259

[22] Filed: Jul. 10, 1997

[51] Int. Cl.$^6$ ........................................... G06F 17/28
[52] U.S. Cl. .................. 709/237; 709/205; 709/223
[58] Field of Search .................. 395/200.68, 200.53, 395/200.35, 200.67; 370/249, 401; 379/243; 709/205, 223, 237, 238

[56] References Cited

U.S. PATENT DOCUMENTS

| | | | |
|---|---|---|---|
| 5,533,116 | 7/1996 | Vesterinen | 379/243 |
| 5,608,720 | 3/1997 | Biegel et al. | 370/249 |
| 5,742,762 | 4/1998 | Scholl et al. | 395/200.53 |
| 5,764,955 | 6/1998 | Doolan | 395/200.53 |
| 5,774,689 | 6/1998 | Curtis et al. | 395/200.35 |
| 5,790,548 | 8/1998 | Sistanizadeh et al. | 370/401 |

OTHER PUBLICATIONS

Alcatel Alsthom document NM–Expert, Alcatel 1303, copyright 1995, Alcatgel Bell, Belgium.

Alcatel Alsthom document "The NM–Expert Reasoning Capabilities", copyright 1996, Alcatel Bell, Belgium.

*Primary Examiner*—Ahmad F. Matar
*Assistant Examiner*—Philip B. Tran
*Attorney, Agent, or Firm*—Ware, Fressola, Van Der Sluys & Adolphson LLP

[57] ABSTRACT

A method and apparatus for controlling command line transfer to a network element. The method and apparatus allow for transfer of command lines such as command lines in the Transaction Language 1 syntax, to a designated network element based upon a wait duration as well as based upon the maximum number of outstanding command lines for which acknowledgement has not yet been received from the network element to whom the command line was directed. As long as the maximum number of outstanding unacknowledged command lines is less than the maximum number set, command lines are transferred to the network element after waiting an amount of time equal to the wait duration. The overall result is that command lines can be directed to network elements with assurance that the commands will be properly executed by the network element. Furthermore, the network element can, to the extent that the command line causes a change in an equipment database associated thereto, appropriately modify the equipment database in the network element and cause such information to be transferred to an overall equipment database containing similar information for all network elements under the control of a network management system.

25 Claims, 6 Drawing Sheets

| TL1 Command Interface Graphical Window | |
|---|---|
| TK R4.2 TCL Toolkit | TCL-DP V4.0a1<br>TCL<br>Distributed Programming |
| TCL R7.6 Tool Common Language | |

| System Serial I/O<br>(Keyborard, Mouse) | Graphical Windowing<br>System<br>(X-Window, MS/<br>Window) | Specific Networking<br>Interface<br>(TCP/UDP) |
|---|---|---|

Fig. 4

METHOD AND APPARATUS FOR CONTROLLING COMMAND LINE TRANSFER TO A NETWORK ELEMENT

TECHNICAL FIELD

The present invention relates to a command line interface module for controlling transfer of commands to a network element such as an asymmetrical digital subscriber loop subscriber access multiplexer (ASAM) forming part of a telephone company central office.

BACKGROUND OF THE INVENTION

It is important that tools be available for performing network management, such as fault management, configuration management and performance management of telephone company central office equipment. In the past, what is known as operations system (OS) has been used for conducting such functions by use of command line languages; such as Transaction Language 1 (TL1). TL1 is a command line language well-known in the art which allows the operator to initiate the execution of various commands at selected equipment within the central office. These commands can be used to monitor alarm status, to perform recovery from alarm situations, to perform configuration management of equipment, as well as to test the performance of equipment.

As equipment installed at the central office has become more and more complex, the use of a command line language can become cumbersome and difficult for the operator. This is particularly apparent with the introduction of asymmetrical digital subscriber loop (ADSL) related equipment which can provide high bandwidth asymmetrical communications, such as network elements (NEs) known as ADSL subscriber access multiplexers (ASAMs) as disclosed in the present assignee's copending U.S. application Ser. No. 08/891,145, entitled A Telecommunications System for Providing both Narrowband and Broadband Services to Subscribers; Subscriber Equipment; a Shelf Therefor; a Replaceable Lowpass Filter Unit; Line Termination Equipment; Network Termination Equipment; and a Telecommunications Rack with a Plurality of Shelves having a Redundancy Feature, filed on Jul. 10, 1997, hereby incorporated by reference. As a result, a network management system (NMS) has been developed for operation on a workstation. This NMS generates commands using the Simple Network Management Protocol (SNMP) and performs fault management, configuration management and performance management functions for such ASAM equipment. This NMS uses an expert system software platform known as the NM-Expert Platform as described in Alcatel Alsthom document NM-Expert, Alcatel 1303, copyright 1995, Alcatel Bell, Belgium, as well as in Alcatel Alsthom document "The NM-Expert Reasoning Capabilities", copyright 1996, Alcatel Bell, Belgium, said documents incorporated by reference. With the use of NM-Expert, the NMS can perform fault management, configuration management and performance management through an intelligent graphically oriented presentation to the operator.

However, there is a need to be able to provide for command line language interface through the same workstation or through a terminal elsewhere at the central office. In particular, there is a need to be able to execute and display results of the command line language known as Transaction Language 1 (TL1) command line language that is widely used with telephone company central office equipment operations to perform management functions for telephony equipment. For an ASAM network element, there is a local equipment database resident within the network element. The ASAM network element includes line termination cards, alarm craft unit cards, and a network termination card which maintains information with respect to the other cards that form an overall ASAM.

In addition to the local equipment database, there is a similar equipment database associated with the NMS. The NMS equipment database maintains equipment data for all the NEs managed by the NMS. When the network element is maintained by the NMS, both the NMS equipment database and the local database within the ASAM are automatically updated at the time of program execution. However for the TL1 command line interface module, it is desirable at times to use what is known as a batch file for execution of a plurality of TL1 commands by the network termination card within the ASAM. It has been found that due to the number of cards forming an overall ASAM, the command line interface module can cause an overflow of TL1 commands to the network termination card which can result in the loss of information and consequent degradation of network management functions.

Thus it is the intent of the present invention to provide a command line interface module in association with a network management system which provides for reliable execution of the command lines and accurate storage of equipment information at the ASAM local equipment database and at the equipment database associated with the NMS.

SUMMARY OF THE INVENTION

A command line interface (CLI) module according to the present invention is typically used with a network management system (NMS). The NMS performs overall network management of network elements (NEs), including fault management, configuration management and performance management. The CLI and NMS are particularly directed for management of asymmetrical digital subscriber loop (ADSL) subscriber access multiplexer (ASAM) NEs that provide enable copper wire pairs that traditionally deliver plain old telephone service (POTS) to subscribers to additionally deliver high speed asymmetrical digital subscriber loop (ADSL) service to the same subscribers. A command line interface module for reading Transaction Language 1 command lines interfaces with a gateway module for providing the TL1 commands to a network termination card of an ASAM. The command line interface module includes means for operator input including reading of batch files containing a plurality TL1 commands for execution. The command line interface module also includes a flow control module that can limit the rate at which TL1 command lines are sent to the network termination card as well as limiting the number of outstanding TL1 command lines which have yet to be executed and acknowledged by the network termination card.

In a particular embodiment of the command line interface module, it is implemented at a workstation that provides overall management of the equipment within a plurality of network elements via the NMS. Such NE equipment typically is found in a telephone company (Telco) central office (CO). In one such implementation, the network elements are ASAMs, wherein the NMS provides the management functions through use of Simple Network Management Protocol (SNMP). However, in view of the requirement by most Telco COs to provide management of such NEs using TL1 commands, the NMS also works in conjunction with the command line interface module for providing management of the NEs using TL1 commands. The command line interface module performs this function in association with a gateway module that routes the TL1 commands to the specific network element desired. The gateway module further provides for directing TL1 commands received from a Telco operations system (OS) to a desired NE.

The overall implementation of the NMS, including the command line interface module, provides for updating a local equipment database residing within the ASAM, typically located in a network termination (NT) card of the ASAM. This local equipment database information is also sent from the ASAM to the NMS equipment database. In this manner, configuration changes to the equipment within any network element is implementable through the TL1 commands with assurance that the update information to local equipment database is properly transferred to the NMS equipment database.

The overall result is a network management system which is able to perform overall management of network elements using SMNP protocol commands and further is able to manage the network elements using Transaction Language 1 commands including batch operations containing a plurality of TL1 commands via a command line interface module.

BRIEF DESCRIPTION OF THE DRAWINGS

For a better understanding of the operation and the nature of the present invention, reference is made to the following detailed description taken in conjunction with the following drawings, wherein:

FIG. 4 is an illustration of the application structure of the command line interface module;

BEST MODE FOR CARRYING OUT THE INVENTION

Figure 1:
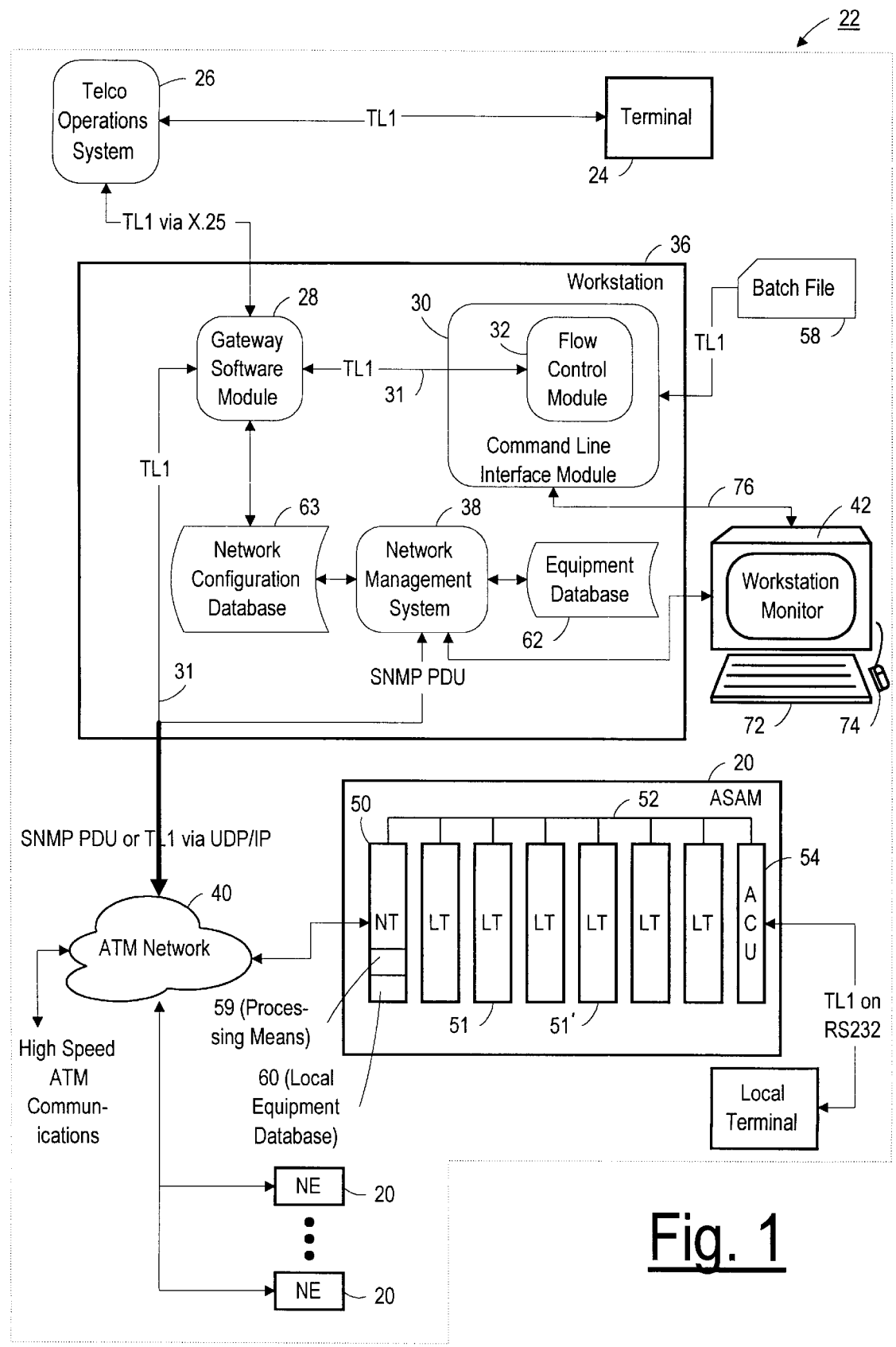
FIG. 1 is a system diagram illustrating the overall network management system, including its communication with a plurality of network elements, and further illustrating the command line interface module, associated gateway module, and the operationa system associated with a central office.

FIG. 1 illustrates an overall system diagram of a plurality of network elements 20 forming part of an overall telephone company (Telco) central office (CO) installation 22. This overall installation includes various components, including one or more terminals 24 associated with the operations system (OS) 26 associated with a Telco CO. The OS communicates via X.25 protocol with a gateway module 28. This gateway module also communicates with a command line interface module 30 that includes a flow control module 32 which sends command lines and receives TL1 responses. The command line interface modules 30 and the gateway module 28 are executed on a workstation platform 36 which also executes the network management software module (NMS) 38 that uses the Simple Network Management Protocol (SNMP). The workstation platform 36 can be a Sun Microsystems SUN Ultra 2 workstation. The NMS commands emanating from the NMS module 38 are in SNMP format while the command lines emanating from the gateway module are typically in the TL1 format. The link layer of the Open System Interconnection (OSI) seven layer communications protocol stack can be X.25 or User Datagram/Internet Protocol (UDP/IP) as illustrated in FIG. 1. As seen in FIG. 1, the SNMP Protocol Data Unit (PDU) and the TL1 commands are actually passed through an asynchronous transfer mode (ATM) network to the various NEs.

The TL1 commands are well known in the telephony art and represent the transaction language most commonly used at central offices to provide management and diagnostic functions to the equipment at the central office. The syntax of a TL1 command line is typically of the form:

verb-modifier-modifier-identifier-list of parameters.

Such command lines are humanly readable unlike the SNMP PDU which are object oriented and designed for machine to machine interaction only. Thus the TL1 command lines can be individually input at a terminal such as terminal 24 used with the Telco operations system 26 or can be input through the command line interface module via an associated monitor/keyboard 72/mouse 74, forming part of the overall workstation 36.

The purpose of the TL1 command lines sent to NEs typically provide fault management, configuration management and performance management of the network elements 20. In the particular implementation shown in FIG. 1, the network elements comprise ASAMs as described in above referenced U.S. patent application Ser. No. 08/891,145, filed Jul. 10, 1997, entitled A Telecommunications System for Providing both Narrowband and Broadband Services to Subscribers; Subscriber Equipment; a Shelf Therefor; a Replaceable Lowpass Filter Unit; Line Termination Equipment; Network Termination Equipment; and a Telecommunications Rack with a Plurality of Shelves having a Redundancy Feature. Other network elements could of course form part of the overall system.

Each TL1 command line can cause a particular operation to be executed by the network termination card 50 within NE 20. As seen in FIG. 1 an ASAM NE generally comprises a network termination card 50, a plurality of line termination cards 51, an alarm craft unit 54, among other components (not shown) as more fully described in the above-mentioned ASAM copending application. The network termination card includes processing means 59 and a local equipment database 60. The TL1 command line is passed and executed by the processing means 59.

The NT communicates by bus 52 with the other cards in the ASAM NE. Thus for example a TL1 command line could cause the reconfiguration of a particular ADSL subscriber line on a particular LT card 51', or it could monitor the alarm status information on the ACU card 54, etc. To the extent that any card within the particular ASAM is reconfigured by the TL1 command line, that reconfiguration is reflected by updating the local equipment database 60 via processing means 59.

Processing means 59, in response to execution of a TL1 command line, sends acknowledgement information back to the command line interface module 30 via a return TL1 response. In addition, to the extent the local equipment database 60 is updated, similar update information is sent to the NMS in SNMP protocol so as to update the equipment database 62 associated therewith which in turn maintains equipment information with respect to all cards in all NEs 20 associated with the NMS.

Figure 5:
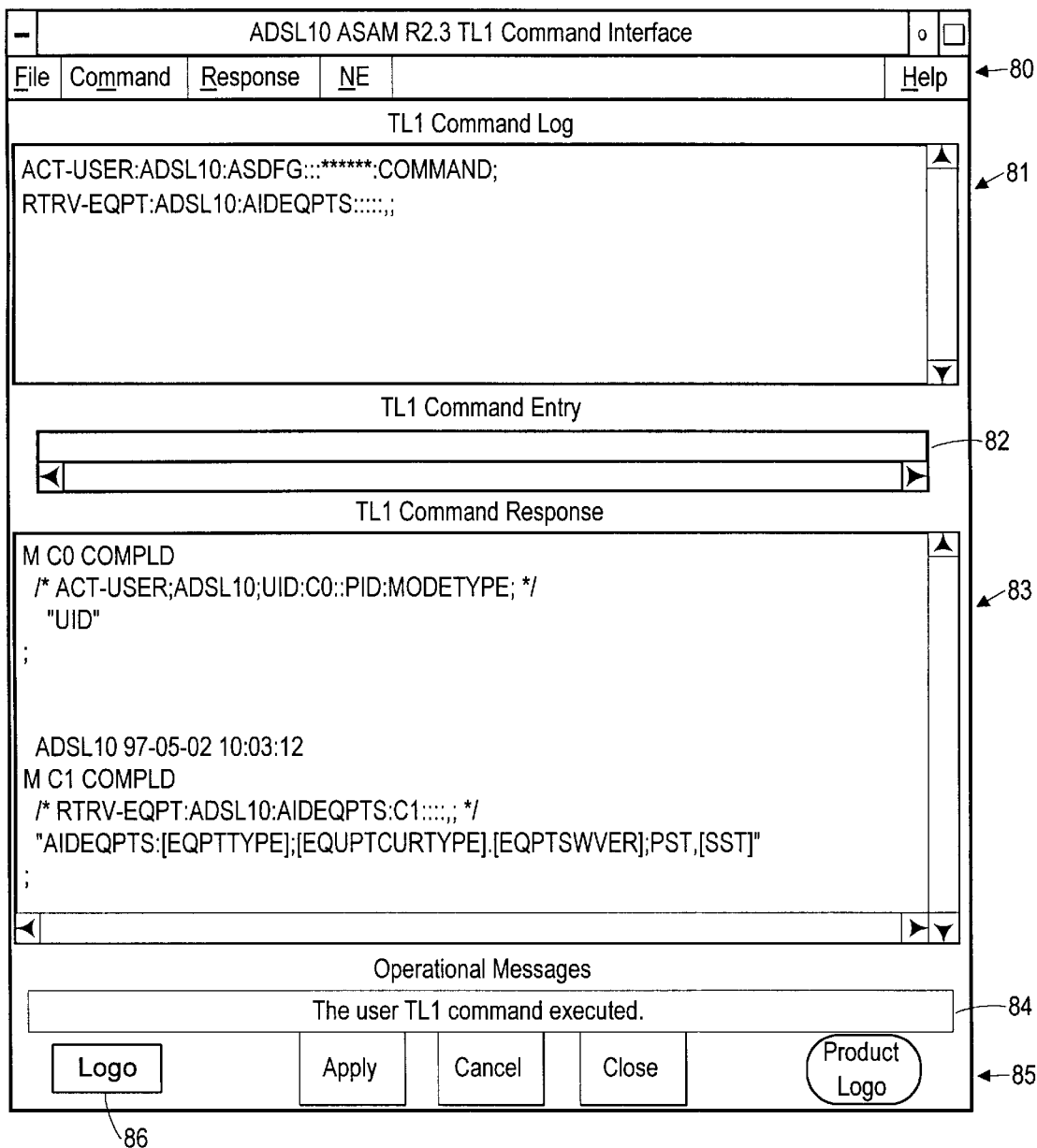
FIG. 5 illustrates the screen format associated with operation of the command line interface module.

It is desirable to provide for execution of a plurality of TL1 command lines forming a batch file 58 which is controlled by the flow control module 32 of the command line interface module 30. The flow control module directs the transfer of TL1 command lines from the command line interface module to the designated network element (as determined by partial parsing of the TL1 command line). The execution of the TL1 commands results in an acknowledgement signal being generated as a return TL1 response which is routed back to the gateway 21 and then to the command line interface module 30 so as to inform the command line interface module of the execution of the command line and the result thereof. The actual presentation of command lines and display results can be displayed to the operator on monitor 42. The display information can be in the form as shown in FIG. 5.

It is however necessary that a particular network element not be presented with TL1 command lines at too rapid a rate, depending upon the ability of the network element to receive and execute TL1 command lines. If the rate is exceeded by the command line interface module, then the TL1 command lines can be misinterpreted or lost entirely, resulting in undesirable performance and/or inaccurate monitoring.

Furthermore, based upon limitations of the particular network element, the number of command lines that can be outstanding at the network element; that is, command lines which have not yet been executed and acknowledged, is limited due to the other processing requirements of the network element. As a result, it is also required that the flow control module 32 limit the number of outstanding TL1 command lines to a particular network element so as not to exceed a predetermined number based upon the ability of the network element to receive and process command lines. For the particular configuration shown in FIG. 1, the maximum number of outstanding unacknowledged command lines for an ASAM is typically four and thus the number of command lines sent by the flow control module is never such as to provide for more than four unacknowledged command lines.

The gateway module 28 controls the flow of information to and from the NEs with respect to the command line interface module 30 and the Telco OS 26. In effect, the gateway module interrogates the network configuration database 63 maintained by NMS 38. The network configuration database maintain information regarding each NE forming the overall system 22. Based upon this database information, the gateway module determines which NE a particular TL1 command is to be directed to as these commands are received via the Telco OS or the command line interface module 30. In addition, the gateway module directs acknowledgement messages from the NTs to the Telco OS or the CLI based upon which entity transferred the command line to the NT.

In summary, the flow control module limits the transfer of TL1 commands to a particular network element so as to be within the receiving and execution capability of the network element. The flow control module further limits the number of outstanding unacknowledged command lines by a particular network element to be less than a predefined limit. In this fashion, a high reliability of proper execution of TL1 command lines is assured in a straight-forward and efficient manner.

In order to ensure that the network management functions conducted via the TL1 command line interface module is properly monitored by the NMS 38, it is necessary that any updates in the configuration status of a card within a network element be reflected in both the local equipment database 60, and in the equipment database 62 resident within workstation 36. This requirement is achieved by the network termination module 50 generating an SNMP protocol command to the NMS 38 in response to any change in the network termination local equipment database 60, such that the SNMP command as interpreted by the NMS 38 causes an appropriate and consistent change in the equipment database 62. Thus the overall result is that the network configuration as shown to the operator of the NMS is consistent with the configuration shown to the TL1 operator or to an operator of a terminal 24 associated with the Telco operations system 26.

Command Line Interface Module Implementation

Figure 2:
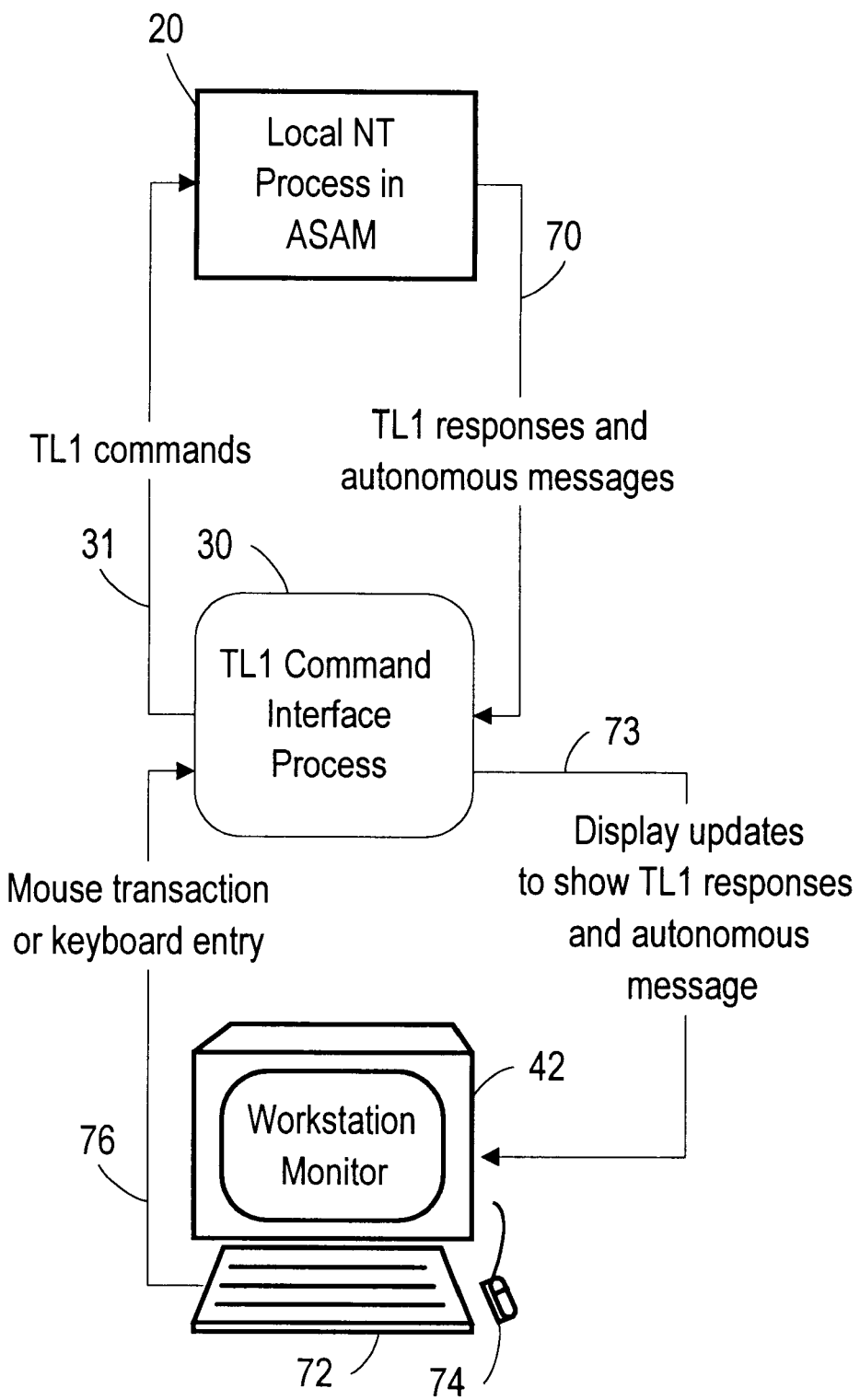
FIG. 2 is an overall context block diagram illustrating the command line interface module shown in FIG. 1 and the routing of command lines, responses and messages related thereto.

FIG. 2 illustrates the context diagram for the command line interface module. As there seen, the command line interface module 30 transfers TL1 command lines 31 to the network termination card process for a designated NE 20 (here the NE is an ASAM). The local network termination card process executes the TL1 command line and communicates with any other designated card in the ASAM as required by the executed TL1 command line. The execution of the TL1 command line results in responses 70 which are communicated back to the command line interface module 30. The command line interface module further conveys display update information 73 to the workstation monitor 42. FIG. 5 illustrates the display area that is presented to the operator on monitor 42. The display area includes a command menu bar for file input/output and related capability, a scrollable TL1 command log window to record execution of TL1 commands, a TL1 command entry window for entry of TL1 commands, a scrollable TL1 response window log to record TL1 responses from the NE, an operation message area to show the results of any interface operation, and a window operation button area to apply or erase a TL1 command line or to terminate the TL1 command line interface. Details of the display area procedure is presented in Table 3 (see also FIG. 3). This display information shows the TL1 response as well as autonomous messages generated by components within a network element. FIG. 2 also shows that keyboard entry or mouse entry is transferred as information 76 to the TL1 command line interface module 30. This allows for manual entry of TL1 command lines to be executed by the network element as well as for receipt of a batch file for execution.

Figure 3:
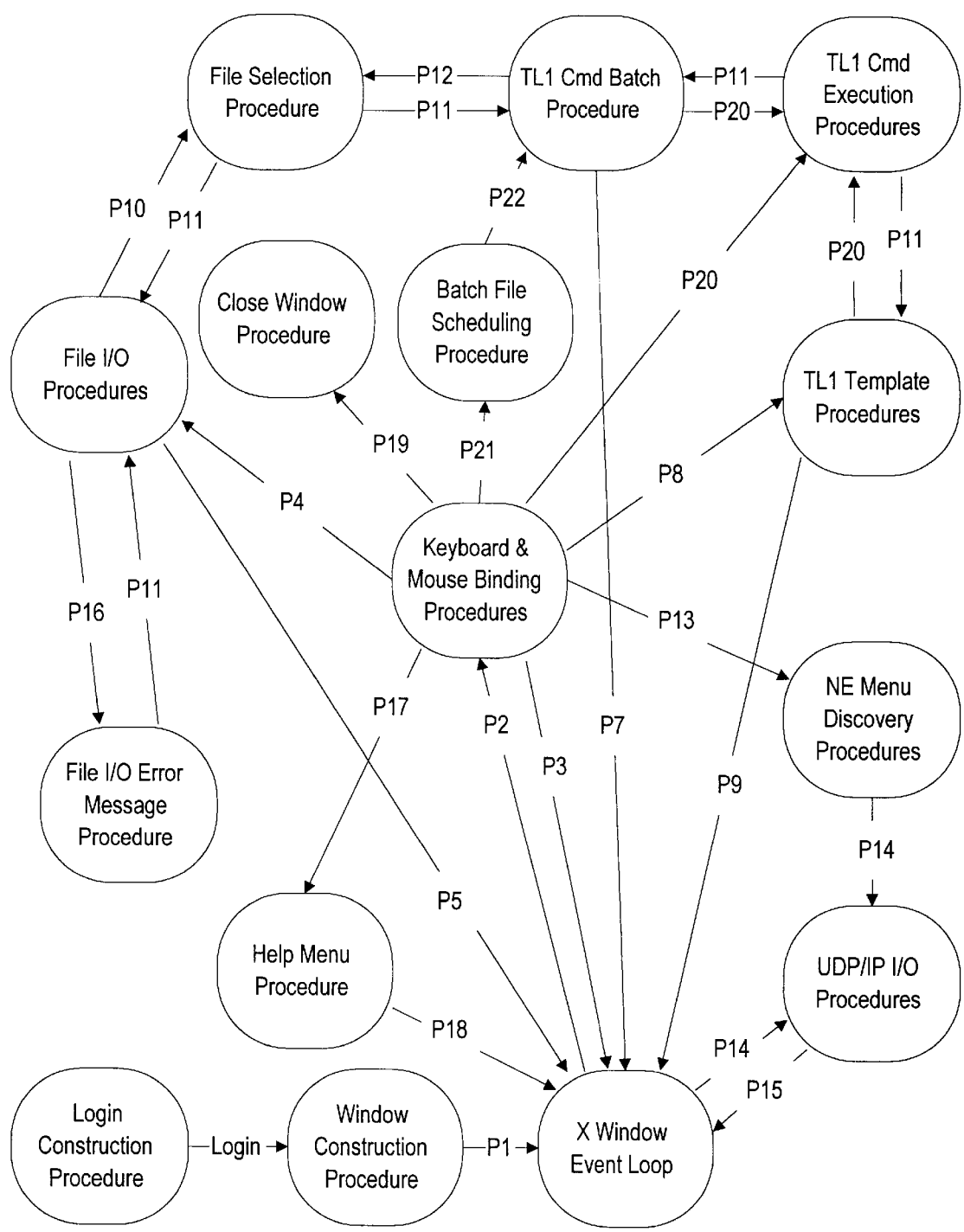
FIG. 3 is the overall program state diagram implemented by the command line interface module, including the flow control module forming part thereof.

FIG. 3 is a detailed flow diagram of the command line interface module operation, including the flow control module 32. The list of abbreviations shown in FIG. 3 are set forth in Table 1. The overall TL1 command line interface module application is based on Tool Common Language (TCL) TCL R7.6/TK4.2 with TCL-DPV4.0A1 TCL Distributed Programming. The Tool Common Language (TCL) is a language developed by Sun Microsystems Laboratories as a freely distributed, multi-platform support and high level scripting language mainly for graphical user interface application development. This language is intended to simplify the graphical application using common interpreted language environment. As a result, it increases application portability among UNIX, MS/Windows, MAC, and VMS without using different graphical programming environments such as Win32, Motif, and the X Toolkit Intrinsics, etc. The TCL Toolkit known as TK R4.2 is obtainable via the World Wide Web address, ftp://ftp.smli.com/pub/tcl. The TCL-DP distribution is obtainable on the World Wide Web address http://www.cs-cornell.edu/info/projects/zeno/tcl-dp/download.hmtl.

The overall structure of the application diagram is presented in FIG. 4. Further details concerning various procedures shown in FIG. 3 are presented in Tables 2–16. Tables 9 and 11 present further details concerning the TL1 command batch procedure forming the flow control module. It is there seen that the context for determining the time intervals between execution of TL1 commands is determined by an extend parameter where the number that follows the extend parameter is the integer number as n milliseconds.

The depth parameter determines the number of TL1 commands that are to be repeated based upon the value of a repeat variable.

The example shown in Table 9 illustrates that TL1 commands as sent out at a rate of one every 1.5 seconds (1500 milliseconds). The 1.5 second wait duration is based upon a default wait duration of 0.5 seconds, to which the extend parameter value is added. Since the depth is 2 and the repeat parameter is 3, the two command lines are each transferred three times for execution by the NT of the NE.

If the value of the maximum number of outstanding (un-acknowledged) command lines is four (as set by the TL1_CLI_BUFFER_SIZE environment variable—see Table 3) then no command lines are transferred by the CLI if four unacknowledged command lines are outstanding. When the number of unacknowledged command lines is again less than four, new command lines are transferred separated in time by the wait duration.

TABLE 1

List of Abbreviations

P1: Window construction completion return
P2: Keyboard and mouse binding event
P3: Event completion return
P4: File I/O request
P5: I/O request completion return
P6: Command batch mode request
P7: Batch mode request completion return
P8: Request TL1 template workspace
P9: Template completion return
P10: Request file selection window2
P11: Completion return
P12: Request file selection window
P13: NE Discovery request
P14: UDP/IP read/write I/O event
P15: Event completion return
P16: File I/O Error message output request
P17: Help request
P18: Request Help return
P19: Close window request
P20: Apply TL1 command request
P21: Schedule batch process request
P22: Submit batch file event

TABLE 2

Procedure specification for procedure 1 -
Login Construction Procedure

| | |
|---|---|
| PROCEDURE 1: | Login Construction Procedure |
| INPUT PROGRAM FLOWS: | Keyboard entry, mouse button transaction |
| OUTPUT PROGRAM FLOWS: | Continue to complete Window Construction Procedure and enter the event loop |

DESCRIPTION:
During the Window Construction Procedure, the login dialog window is presented to allow the user to execute a login procedure. The user name and password are required in order to proceed with NE login process and the password is suppressed both on the password entry window and TL1 Command Log Window. When the user uses the main window menu "NE" to switch the communication session among different NEs, the Login Construction Procedure is mandatory.

TABLE 3

Procedure specification for procedure 2 -
Window Construction Procedure

| | |
|---|---|
| PROCEDURE 2: | Window Construction Procedure |
| INPUT PROGRAM FLOWS: | None |
| OUTPUT PROGRAM FLOWS: | Popping up the TL1 command interface window and entering the event loop. |

DESCRIPTION:
This procedure represents the X-window construction task which creates all widget components in the command interface application and pops up the main graphical window working space. Before entering the event loop, the procedure also establishes the UDP/IP connection to the ASAM.

This is the bottom portion of the interface to contain the application identification, and interface operation buttons such as "Apply", "Cancel", "Close".

Apply to apply TL1 command line in the TL1 Command Entry Window

Cancel to erase the TL1 command line in the TL1 Command Entry Window

Close to terminate the TL1 Command Interface application

After the TL1 Command Line Interface Window is opened, the operator needs to proceeds with a ASAM login procedure to establish command communication session on ASAM. The "ACT-USER" TL1 command line is required to be the first command line from the TL1 Command Interface Window.

If the TL1 Command Line Interface Window is idle for a specific time interval set in ASAM session manager control, the ASAM session manager logs this window out for security and resource utilization. Once the TL1 Command Line Interface Window is logged out, the operator will need to log back in to re-establish the command communication.

The user can press a logo 86 to send a keep-alive-signal to NE in order to have the session opened for NE autonomous messages. When the logo is pressed, the TL1 Command Line Interface sends the RTRV-HDR command line to the NE periodically. The time interval of each signal is user configurable.

Once window is constructed, the procedure reads the system environment variable $$TL1\_CLI_{13} BUFFER\_SIZE$$

This environment variable is set to the maximum number of outstanding TL1 command lines for which acknowledgement has not yet been received. An example for up to four outstanding TL1 command lines is thus $$TL1\_CLI_{13} BUFFER\_SIZE=4.$$

Another environment variable is read that determines the default wait duration in milliseconds, such as:

$$DEFAULT\_WAIT\_DURATION=500$$

for a default wait of 500 ms.

TABLE 4

Procedure specification for procedure 3 -
X-Window Event Loop

| | |
|---|---|
| PROCEDURE 3: | X-Window Event Loop |
| INPUT PROGRAM FLOWS: | Keyboard entry, mouse button transac- |

TABLE 4-continued

Procedure specification for procedure 3 -
X-Window Event Loop

|  |  |
|---|---|
|  | tion, or UPD socket read/write event |
| OUTPUT PROGRAM FLOWS: | Calling corresponding event handler procedure to perform a specific function |
| DESCRIPTION | |

This is a hidden procedure provided by TCL/TK graphical shell environment. It is an endless event loop which is triggered by outstanding program events such as user keyboard entry, mouse operation, and UPD/IP socket read and write events.

TABLE 5

Procedure specification for procedure 4 -
Keyboard and Mouse Binding Procedures

| PROCEDURE 4: | Keyboard and Mouse Binding Procedures |
|---|---|
| INPUT PROGRAM FLOWS: | Keyboard entry and mouse operation |
| OUTPUT PROGRAM FLOWS: | Calling corresponding procedure to perform specific task. |
| DESCRIPTION | |

This is a set of binding procedures to handle widget binding requests for different widgets. It includes:

| B1) | TL1 command entry binding |
|---|---|
| B2) | TL1 command log window binding |
| B3) | Apply button binding |
| B4) | Cancel button binding |
| B5) | Close button binding |
| B6) | Save (Command/Response) As menu binding |
| B7) | Save (Command/Response) menu binding |
| B8) | Template menu binding |
| B9) | Print menu binding |
| B10) | Execute menu binding |
| B11) | Help menu binding |
| B12) | Close menu binding |
| B13) | Clear command and response log menu binding |
| B14) | Schedule batch file binding |

Figure 6:
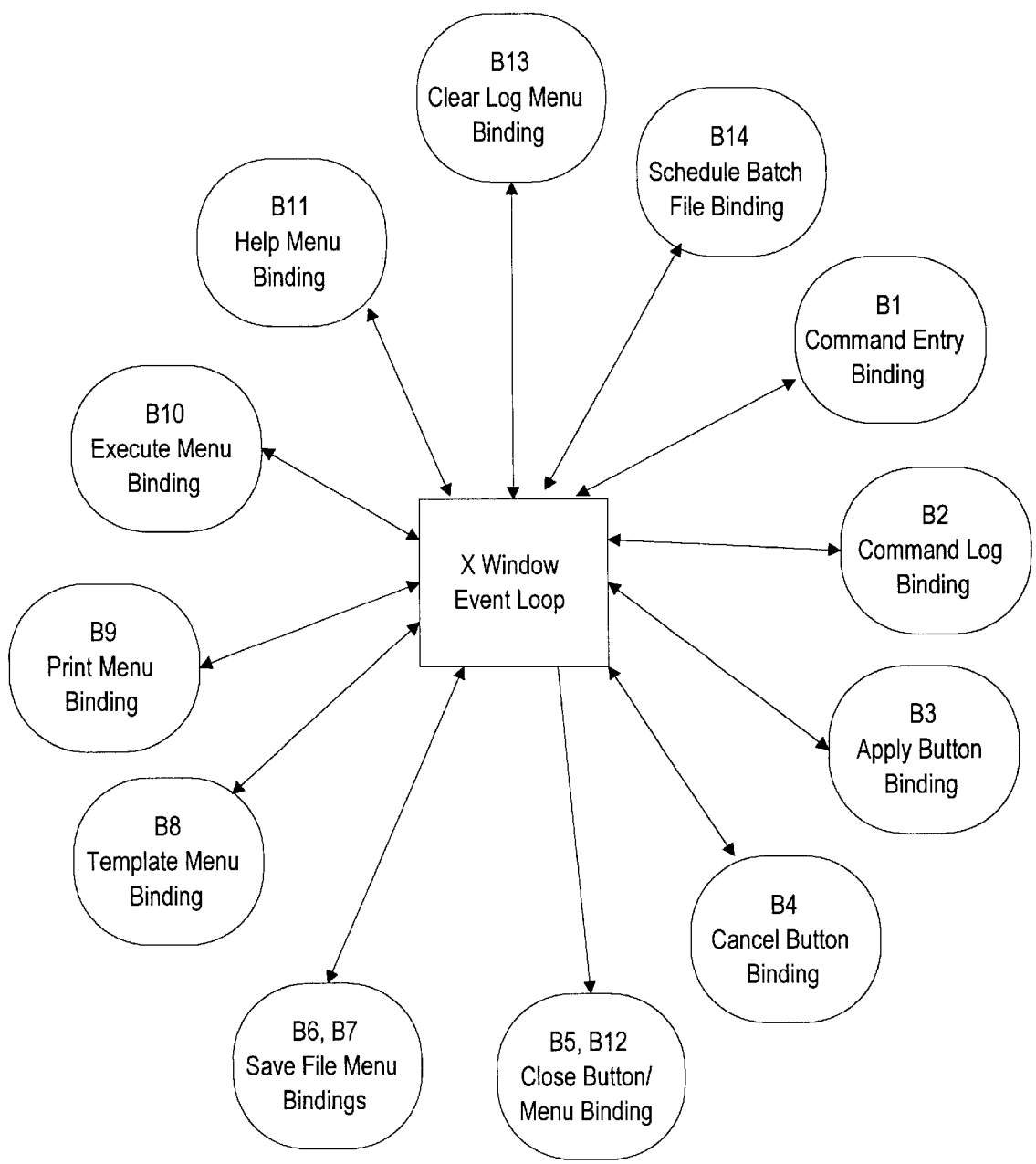
FIG. 6 is a binding diagram of the keyboard and mouse associated with the command line interface module.

See Figure 6 for further details.

TABLE 6

Procedure specification for procedure 5 -
File I/O Procedures

| PROCEDURE 5: | File I/O Procedures |
|---|---|
| INPUT PROGRAM FLOWS: | Save or Print binding procedure |
| OUTPUT PROGRAM FLOWS: | Return to the X Window Event Loop |
| DESCRIPTION | |

The File I/O procedures consist of six individual procedures to perform file I/O and print tasks. They are:

| 1) | Batch Command execution procedure |
|---|---|
| 2) | Save Commands As procedure |
| 3) | Save Command procedure |
| 4) | Save Responses As procedure |
| 5) | Save Responses procedure |
| 6) | Print procedure |

The Execute, Save Commands As, Save Responses As, and Print procedures call the File Selection procedure to provide a file selection dialog window for user selection. The Save Commands and Save Responses procedures use previous user selection to perform file I/O functionality. If any selection error occurs, a message dialog box pops up to show the result and request for user confirmation.

TABLE 7

Procedure specification for procedure 6 -
File Selection Procedure

| PROCEDURE 6: | File Selection Procedure |
|---|---|
| INPUT PROGRAM FLOWS: | Calling from File I/O Procedure or TL1 Command Batch Procedure as the file name needed |
| OUTPUT PROGRAM FLOWS: | Return to File I/O Procedure or TL1 Command Batch Procedure |
| DESCRIPTION | |

This procedure constructs and pops up a file selection dialog box for user to enter a specific file name. The operator can either enter a file name in the Open File Entry window or do single mouse button click on a file name from the file name list to specify the output file. Clicking on the ".." points to the one level higher parent directory and presents a new file list under this new directory in the window. Clicking on a directory on the file list points to this directory and presents its file list in the window. Pressing OK button confirms the file name selection and Cancel button for cancellation to clear the Open File window and selection window.

TABLE 8

Procedure specification for procedure 7 -
File I/O Error Message Procedure

| PROCEDURE 7: | File I/O Error Message Procedure |
|---|---|
| INPUT PROGRAM FLOWS: | Calling from File I/O Procedure as error occurs |
| OUTPUT PROGRAM FLOWS: | Return to File I/O Procedure |
| DESCRIPTION: | |

This procedure outputs File I/O error message on a pop-up dialog box and requests user confirmation. Pressing OK button acknowledges the transaction or Cancel button for cancellation.

TABLE 9

Procedure specification for procedure 8 -
TL1 Command Batch Procedure

| PROCEDURE 8: | TL1 Command Batch Procedure |
|---|---|
| INPUT PROGRAM FLOWS: | Calling from the TL1 Command Batch Binding Procedure |

RTRV-HDR:ADSL10::::::;
RTRV-PM-ADSL:ADSL10:AIDADSL:::MONADSL,,LOCN,,TMPER,MADAT,MONTM;
RTRV-HDR:ADSL10::::::;
The execution duration of the command 'RTRV-PM-ADSL' is 1500 ms (500 ms default wait plus 1000 ms extend value) per each command and repeat three times. Both a user comment with '#' at the beginning of the line and comment text after the control flow statement are acceptable comment format.

TABLE 10

Procedure specification for procedure 9 -
TL1 Template Procedure

| PROCEDURE 9: | TL1 Template Procedure |
|---|---|
| INPUT PROGRAM FLOWS: | Calling from the TL1 Template Binding Procedure |
| OUTPUT PROGRAM FLOWS: | Return to the X Window Event Loop |
| DESCRIPTION: | |

When the operator enters a partial command without semicolon as the command terminator in the TL1 command entry window, pressing the APPLY button with empty TL1 entry, or select the Template menu, the TL1 Template procedure is called. This procedure opens a system pregenerated TL1 command template file from the NMS distribution, posts the whole set of ASAM R2.2 TL1 command line template into a scrollable pop-up dialog window. Also, the most similar TL1 command line template matching the user partial command is highlighted, visualized and

TABLE 10-continued

Procedure specification for procedure 9 -
TL1 Template Procedure decomposed into eight command fields in the TL1 Command Workspace. The operator can work on the command construction in the TL1 Command Workspace. Each command field prompts all possible parameter options by pop-up menu once the operator does a single right mouse
button click on a specific parameter field.
The Apply button works in the same way as any other Apply button in the TL1 command Interface window. The completed TL1 command in the TL1 Command Workspace is sent to ASAM by pressing the Apply button in the TL1 Template Window. The Cancel button deselects the selection and clears the TL1 Command Workspace. The Close button terminates the TL1 template construction.
The operator also can double click the right mouse to invoke the prompting mode in the TL1 Command Workspace when this template window is invoked by Template menu option.

TABLE 11

Procedure specification for procedure 10 -
TL1 Command Execution Procedure

| | |
|---|---|
| PROCEDURE 10: | TL1 Command Execution Procedure |
| INPUT PROGRAM FLOWS: | Calling from the Apply button, the T1 Command Batch, or the TL1 Template Binding Procedure |
| OUTPUT PROGRAM FLOWS: | Return to the TL1 Command Batch or Template binding procedure |
| DESCRIPTION: | |

This procedure sends the TL1 command line to the ASAM, records this command line to the TL1 Command Log Window, and prints a completion message in the Operation Message area.

TABLE 12

Procedure specification for process 11 -
Close Window Procedure

| | |
|---|---|
| PROCEDURE 11: | Close Window Procedure |
| INPUT PROGRAM FLOWS: | Calling from the Close button Binding Procedure |
| OUTPUT PROGRAM FLOWS: | Terminating the TL1 Command Interface application |
| DESCRIPTION: | |

This procedure terminates the TL1 Command Line interface application, It also sends a zero byte length ASCII string to ASAM in order to notify the ASAM communication session manager that the application is terminated.

TABLE 13

Procedure specification for procedure 12 -
Help Window Procedure

| | |
|---|---|
| PROCEDURE 12: | Help Window Procedure |
| INPUT PROGRAM FLOWS: | Calling from the Help button Binding Procedure |
| OUTPUT PROGRAM FLOWS: | Return the X Window Event Loop |
| DESCRIPTION: | |

This procedure constructs a help facility window to show the operational information of the TL1 Command Line interface application. Pressing the Close button terminates the help facility.

TABLE 14

Procedure specification for procedure 13-
UDP/IP Procedure

| | |
|---|---|
| PROCEDURE 13: | Help Window Procedure |
| INPUT PROGRAM FLOWS: | Calling from the X Window Event Loop |

TABLE 14-continued

Procedure specification for procedure 13-
UDP/IP Procedure

| | |
|---|---|
| OUTPUT PROGRAM FLOWS: | Return The X Window Event Loop |
| DESCRIPTION: | |

This procedure handles UDP/IP socket read and write functionalities once the communication socket is readable when it contains incoming data or is for write when it is empty.

TABLE 15

Procedure specification for procedure 14 -
NE Menu Discovery Procedure

| | |
|---|---|
| PROCEDURE 14: | NE Menu Discovery Procedure |
| INPUT PROGRAM FLOWS: | Calling from the X Window Event Loop |
| OUTPUT PROGRAM FLOWS: | Return The X Window Event Loop |
| DESCRIPTION: | |

This procedure handles NE discovery and menu construction procedure. When this menu is selected, the command line interface sends an NE discovery request the gateway and processes the response to construct an NE selection list. If the user network is reconfigured to delete or add an ADSL node, the NE selection list reflects the change.

TABLE 16

Procedure specification for procedure 15 -
TL1 Batch File Scheduling procedure

| | |
|---|---|
| PROCEDURE 15: | TL1 Batch File Scheduling Procedure |
| INPUT PROGRAM FLOWS: | Calling from the X Window Event Loop |
| OUTPUT PROGRAM FLOWS: | Return the X Window Event Loop |
| DESCRIPTION: | |

In this procedure the TL1 batch file scheduling procedure takes the user preferred batch file and the time when it will be executed by the TL1 Command Line interface. It requires the full path of the batch file and the digital time by hh:mm format as the user entries on the CLI Batch File Schedule Window. At the specific time CLI is doing command execution, it will defer the batch process 10 minutes and retry it until the current command execution is completed, then start the batch process as user specified. CLI only allows one outstanding batch process submitted.

Summary:

In summary, the command line interface module with its associated flow control module provides the means by which TL1 command lines can be sent to a network element for execution with assurance that the network element will be able to execute the command line and acknowledge the result thereof so as to update the local equipment database in the NE and the overall equipment database of the NMS. By pacing the execution of TL1 command lines sent to the network element in conjunction with the maximum number of outstanding command lines for which acknowledgement has not yet been received by the command line interface module, assurance is obtained that all TL1 command lines are properly executed by the designated network element.

The overall result is that Telco operations system can continue to make use of the TL1 language to perform overall network element management while allowing network element management using the SNMP protocol NMS in a harmonious fashion. The invention, although specifically directed for association with an ADSL subscriber access multiplexer (ASAM) type network element, may also be used with other network elements within a central office or elsewhere.

It should be understood that the following detailed description was presented to illustrate a preferred embodiment for carrying out the invention and should therefore only be considered as illustrative, rather than in a limiting sense.

Having described the invention, what is claimed is:

1. A method for controlling the transfer of command lines to a network element, comprising the steps of:
   1) determining the maximum number of command lines that can be unacknowledged by a network element,
   2) determining the wait duration for a command line;
   3) reading a command line from a batch file;
   4) determining the number of command lines that have not been acknowledged by the network element and if the number of unacknowledged command lines is less than said maximum number, transferring the command line to the network element after waiting an amount of time equal to the wait duration; otherwise waiting at least until the number of unacknowledged command lines is less than said maximum number before transferring the command line to the network element; and
   5) repeating at least steps 3 and 4.

2. A method for controlling command line transfer as defined in claim 1, further wherein the method is used in combination with a network management system operating under SNMP protocol for performing network element management of the network elements.

3. A method for controlling command line transfer as defined in claim 2, wherein the network management system has an equipment database associated therewith and further wherein the method for controlling command line execution includes the step of updating the information in a local equipment database within the network element to which the execution of a command line is made and causing the transfer of said information to the network management system equipment database.

4. A method for controlling command line transfer as defined in claim 3, further comprising the step of providing a gateway for receipt of command lines from step 4 so as to direct the commands lines to the designated network element.

5. A method for controlling command line transfer as defined in claim 4, wherein a central office operating system can also transfer command lines to a network element, wherein said transfer is through said gateway, and wherein acknowledgement of execution of a command line by a network element includes information with respect to where the command line has been transferred from, and wherein the gateway directs acknowledgement to the source of the original command line.

6. A method for controlling command line transfer as defined in claim 1, further comprising the step of determining the wait duration for a command line after transferring a previous command line to a network element so that said wait duration can vary dynamically.

7. A method for controlling command line transfer as defined in claim 1, further comprising initially determining a default wait duration for a command line and using the default wait duration as the minimum amount of time to wait before transferring a command line, and if a wait duration is determined in step 2, adding said wait duration to the default wait duration in order to determine the amount of time to wait before transferring a command line.

8. A method for controlling command line transfer as defined in claim 7, further comprising the step of determining a repeat value and a depth value for a sequence of command lines so as to repeat the transfer of command lines equal to the value set by the repeat parameter for a number of command lines equal to the depth variable and wherein the wait duration is the same between each transferred command line.

9. A method for controlling command line transfer as defined in claim 1, further comprising the step of determining a repeat value and a depth value for a sequence of command lines so as to repeat the transfer of command lines equal to the value set by the repeat parameter for a number of command lines equal to the depth variable and wherein the wait duration is the same between each transferred command line.

10. A method for controlling command line transfer as defined in claim 1, wherein if the number of unacknowledged command lines is equal to or greater than said maximum number for at least a predetermined length of time, generating a warning message.

11. A method for controlling command line transfer as defined in claim 1, further comprising the step of displaying command lines which have been transferred to the network element as well as the acknowledgement response from the network element after execution of the command line.

12. A method for controlling command line transfer as defined in claim 2, wherein if the number of unacknowledged command lines is equal to or greater than said maximum number for at least a predetermined length of time, generating a warning message.

13. A method for controlling command line transfer as defined in claim 1, wherein each command line conforms to the syntax of Transaction Language 1.

14. A system for controlling the transfer of command lines to a network element, comprising:
   A) means for determining the maximum number of command lines that can be unacknowledged by a network element,
   B) means for determining the wait duration for a command line;
   C) means for reading a command line; and
   D) means for determining the number of command lines that have not been acknowledged by the network element and if the number of unacknowledged command lines is less than said maximum number, transferring the command line to the network element after waiting an amount of time equal to the wait duration; otherwise waiting at least until the number of unacknowledged command lines is less than said maximum number before transferring the command line to the network element.

15. A system for controlling the transfer of command lines to a network element as defined in claim 14, wherein the means for reading a command line performs said reading of command lines from a batch file containing a plurality of command lines, and wherein said reading of the next command line from the batch file is performed after the means for determining and transferring a command line to the network element has transferred a command line to the network element.

16. A system for controlling command line transfer as defined in claim 14, further comprising means for determining the wait duration for a command line after transferring a previous command line to a network element so that said wait duration can vary dynamically.

17. A system for controlling command line transfer as defined in claim 14, wherein the means for determining the wait duration of a command line first determines a default wait duration for a command line, which default wait duration is the minimum amount of time to wait before transferring a command line.

18. A system for controlling command line transfer as defined in claim 17, further comprising the means of determining a repeat value and a depth value for a sequence of command lines so as to repeat the transfer of command lines equal to the value set by the repeat value for a number of command lines equal to the depth value and wherein the wait duration is the same between each transferred command line.

19. A system for controlling command line transfer as defined in claim 14, further comprising the means of determining a repeat value and a depth value for a sequence of command lines so as to repeat the transfer of command lines equal to the value set by the repeat value for a number of command lines equal to the depth value and wherein the wait duration is the same between each transferred command line.

20. A system for controlling command line transfer as defined in claim 14, further comprising means for generation or error message if the number of unacknowledged command lines is equal to or greater than said maximum number for at least a predetermined length of time.

21. A system for controlling command line transfer as defined in claim 14, further comprising the step of displaying command lines which have been transferred to the network element as well as the acknowledgement response from the network element after execution of the command line.

22. A system for controlling command line transfer as defined in claim 14, wherein the NE is an asymmetrical digital subscriber loop subscriber access multiplier.

23. A system for controlling command line transfer as defined in claim 14, wherein each command line conforms to the syntax of Transaction Language 1.

24. A system for controlling command line transfer as defined in claim 14, further wherein the system has means for updating the information in a local equipment database within the network element to which the execution of a command line is made.

25. A system for controlling command line transfer as defined in claim 24 for use with a network management system (NMS) that has a separate equipment database associated therewith for maintaining information regarding network elements to which the NMS communicates, wherein the system for controlling command line transfer further has means for causing the information updated in the local equipment database to be transferred to the NMS equipment database.

* * * * *